Sept. 15, 1931.  W. G. LLOYD  1,823,498
MACHINE FOR CANDY MAKING
Filed Aug. 12, 1930   2 Sheets-Sheet 2

William G. Lloyd INVENTOR
BY Charles W. Lovett
ATTORNEYS.

Patented Sept. 15, 1931

1,823,498

UNITED STATES PATENT OFFICE

WILLIAM G. LLOYD, OF LYNN, MASSACHUSETTS

MACHINE FOR CANDY MAKING

Application filed August 12, 1930. Serial No. 474,743.

This invention relates to machines for candy making, and more particularly to the type designed to produce shells, tubes, or jackets, hereinafter called shells, from chocolate liquid or paste, or other suitable material, adaptable for later filling with cream, fruit jelly, and what not.

It has for its objects to provide an efficient and inexpensive manufacturing equipment for forming or casting liquid, paste, or dry material, into shells and for removing same when set, hardened, or finished, said equipment adaptable for gang or multiple unit assembly; to increase production with minimum help; to reduce production cost; to insure uniformity in product; and to provide the various other advantages and results made evident from the following specifications:

I accomplish the objects of my invention as shown in the accompanying drawings, which form a part of this specification and in which similar letters of reference refer to similar parts throughout the various views. The mechanism comprises a body form mould holding plate immovably fixed upon parallel uprights. A stripper plate slidably mounted upon said uprights just below said body form plate and adaptable to hold the finished shells within the moulds in said body form plate when the inside formers on the inside former plate, hereinafter referred to, are withdrawn, an inside former plate, with inside formers thereon, slidably mounted on said uprights immediately beneath said stripper plate, a thermal chamber or heater plate, hereinafter called heater plate, also slidably mounted on said uprights, below said inside former plate, a table plate slidably mounted on said uprights, beneath said heater plate and equipped with lifting and lowering means, hydraulic or otherwise, a punch plate or shell remover, with punches mounted thereon, slidably mounted on said uprights above said body form plate and also equipped with lifting and lowering means similar to that on said table plate, and a basket adaptable to catch said shells as they are forced out of the moulds in said body form plate by lowering the punches and punch plate after the stripper and other parts beneath are in lowered position so as to provide room for the basket to be inserted under the body form plate.

Figure 1:
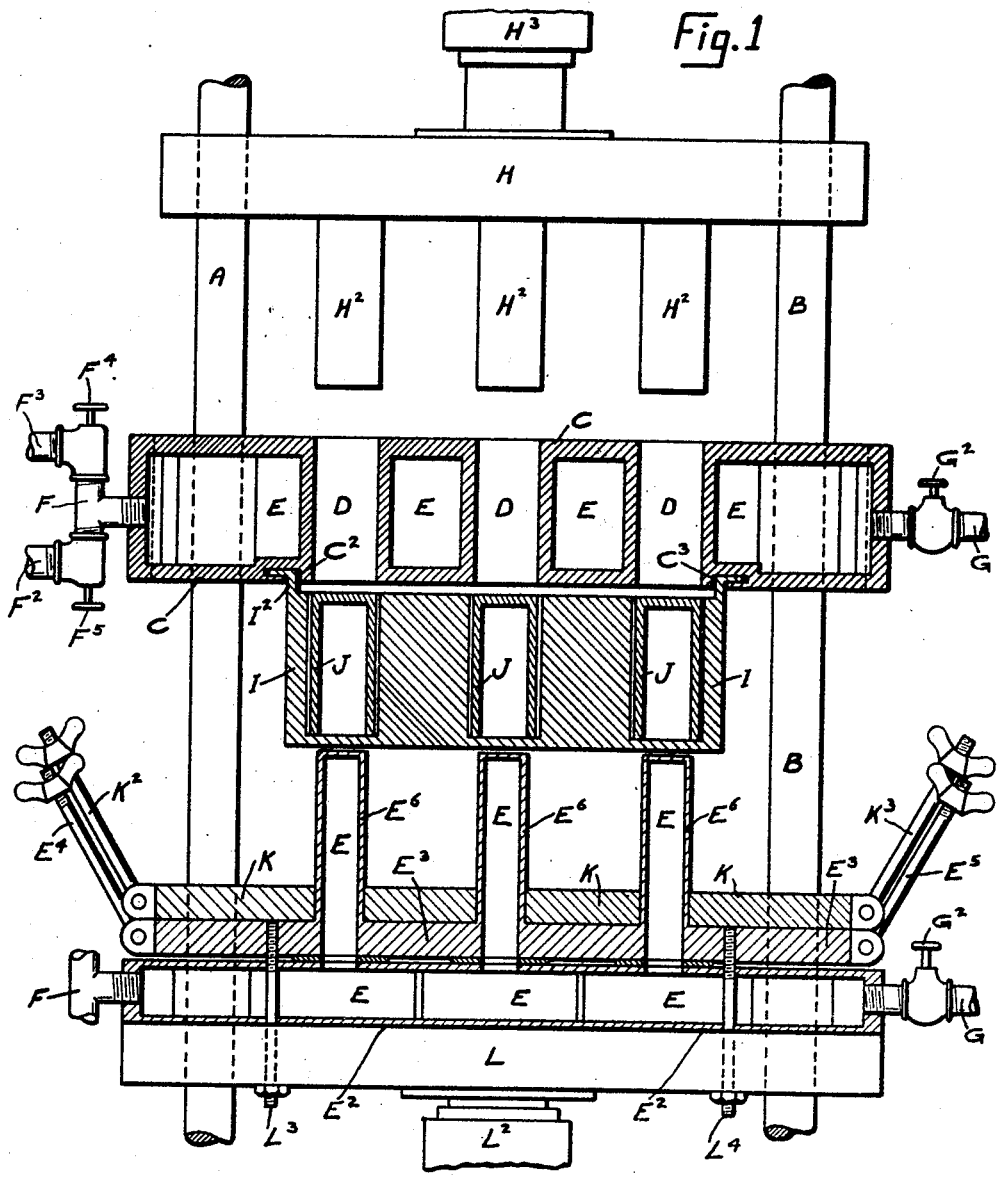
Figure 2:
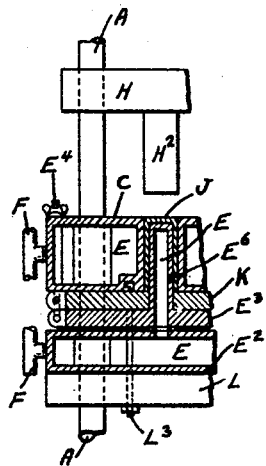
Figure 3:
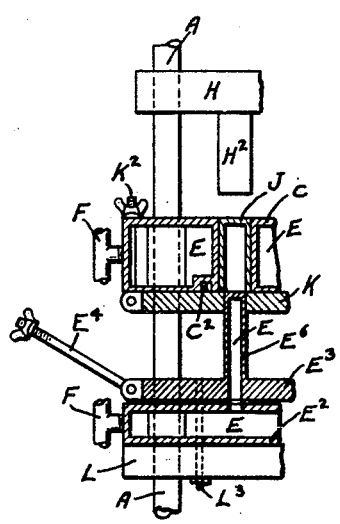
Figure 4:
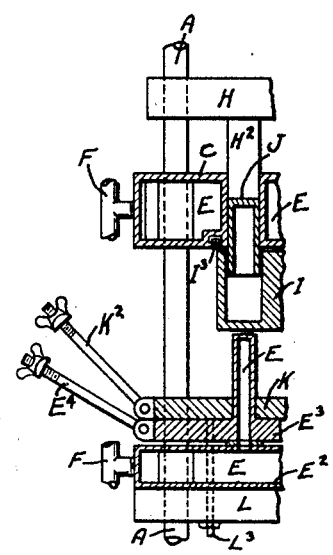
Figure 5:
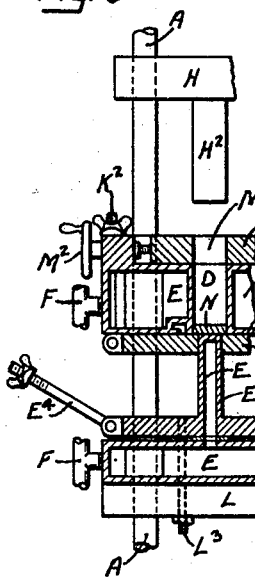
Figure 6:
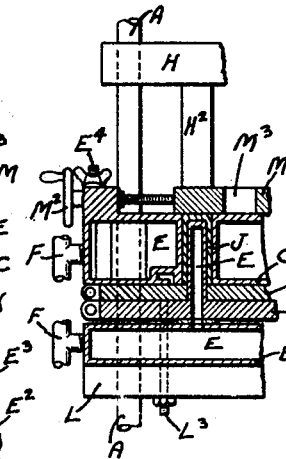
Figure 7:
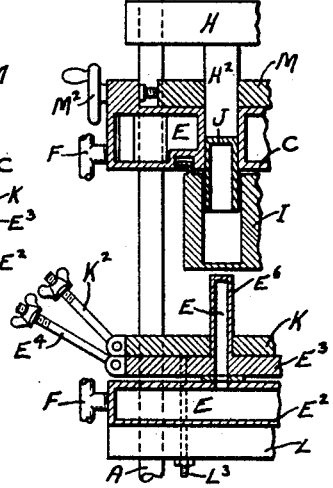

In the drawings, Figure 1 shows a front view of the machine in gang form with the finished shells dropped from the moulds into the receiving basket which basket is conveniently held in position on the machine by projecting fingers thereon which engage grooves in the body form plate. Figure 2 shows a sectional front view of the machine with the inside former plate, stripper plate, heating plate and table plate all in raised position of contact and the substance from which the shell is composed in position within said shell moulds in said body form plate and about the inside formers. Figure 3 is a sectional front view similar to Figure 2 with the stripper plate in position of contact below the body form plate, the inside former plate, the heater plate and the table plate being in lowered position preparatory to removing the finished shells from the body form plate. This view shows the function of the stripper plate in holding the shells within the body forms while the inside former plate is being lowered. Figure 4 shows a sectional front view with the stripper plate, inside former, heating plate, and table plate lowered to make room for the basket positioned below the body form to catch the shells as they are pressed out of the body forms by said punches in lowering the punch plate. Figure 5 shows a modification of the machine for use in producing shells from tablet substance such as hard chocolate. The construction of the modified machine is identical except that a gate valve plate is slidably mounted on top of the body form plate. In Figure 5 the openings in said valve plate are registered with the body moulds in the body form plate so as to allow passing of the punches therethrough. Figure 6 shows the gate valve plate in position sealing the top of the moulds in the body form plate, the stripper plate, inside former, heater plate and table plate being in positions of contact, by force of which the tablet, of predetermined size, is pressed and moulded to the shell shape desired. Figure 7 shows the position of the parts of the modified machine in removing the finished shells. The body form plate, inside formers and heater unit are water jacketed so as to alternately receive hot and cold water and in this manner the exact temperature desired for the parts is secured for improved results in creating and handling the product at various stages of manufacture.

Referring again to the drawings A and B show uprights to which the body form plate C is secured in fixed position. D shows the shell moulds in said plate. E shows the water jackets in the body form plate the inside former plate and formers and the heating plate. F shows the water inlets, G shows the outlets and $G^2$ the controlling valves therefor. $F^2$ shows the hot water and $F^3$ the cold water connections controlled by the valves $F^4$ and $F^5$. H shows the punch plate and $H^2$ the punches positioned thereon, $H^3$ shows the lifting and lowering means for the punch plate H. I shows the basket into which the finished shells J fall. $I^2$ and $I^3$ show fingers on the basket which engage the grooves $C^2$ and $C^3$ on the form plate and thereby function to hold the basket in position below the shell moulds D. K shows the stripper plate, slidably mounted on the uprights A and B and orificed to provide for the passing therethrough of the inside formers $E^6$, and to snugly fit against said formers at said orifices. $E^2$ shows the heater plate. $E^3$ shows the inside former plate. L shows the table plate and $L^2$ shows the lifting and lowering means therefor. The inside former plate $E^3$, the heater plate $E^2$ and the table plate L are secured together by the bolts $L^3$ and $L^4$ so as to make the water jackets E tight, and for convenience in raising and lowering. The stripper plate K is provided with the clamps $K^2$ and $K^3$ adaptable to engage the body form plate C, and thus secure the stripper plate beneath the body form plate while the inside formers $E^6$ are being withdrawn as shown in Figure 3. The inside former plate $E^3$ carrying thereon the inside formers $E^6$ is also provided with the locking clamps $E^4$ and $E^5$ adaptable to engage the body form plate C and thus secure the inside former plate with its appendages to the body form plate, as shown in Figure 2, when the device is in position and readiness for pouring of the material from which the shells are formed. The pouring means is no part of this invention having been heretofore perfected by the production of well-known and largely used devices.

In the operation of the device as shown in figures from 1 to 4 inclusive the pouring of the material, in liquid or paste form, from which the shells are formed is made when the parts are positioned as shown in Figure 2, the said material being inserted from the top or open end of the moulds D. During this pouring process the water jackets E may well be filled with hot water from the source $F^2$ to better insure a perfectly formed shell. After the shell material has been poured, the hot water in the jackets E is withdrawn at the outlets G which are then closed and cold water admitted to the jackets E from the source $F^3$. The change of temperature thus effected hardens the shell substance and they are then ready for removal, which is accomplished by lowering the parts $E^3$ and $E^2$ and L as shown in Figure 3, next lowering the stripper plate K, inserting the basket I and lowering the punch plate H all as shown in Figure 4. In this operation the punchers $H^2$ press against the shells J and force them out of the moulds D into the basket I. The shells are then ready for filling.

In the modified form of the device shown in Figures 5 to 7 inclusive, a gate valve plate M slidably mounted on top of the body form plate C, is provided with a sliding control $M^2$ and orifice $M^3$ so as to either leave the top of the mould open as shown in Figure 5, or close the top of the mould D as shown in Figure 6. In the operation of this modification, a tablet N, in Figure 5, of dry material such for example as chocolate, of predetermined size, is inserted within the open top of the mould D when the parts are positioned as in Figure 5. The gate valve M is then repositioned as shown in Figure 6. This operation perfectly forms the shells J from the tablets N as shown in Figure 6, after which the said shells are removed as shown in Figure 7, and as hereinbefore described.

It will be understood that the thermal management and control may be electrical or otherwise, although hot and cold water is found very simple, satisfactory and effective.

While I have illustrated and described a preferred construction for carrying my invention into effect, this is capable of variation or modification without departing from the spirit of the invention. I therefore do not wish to be limited to the exact details of construction herein set forth but desire to avail myself of such variations and modifications as come within the scope of the appended claims.

Having thus described my invention I claim as new and desire to secure by Letters Patent of the United States of America:

1. In a device of the kind described the combination of a body form, mould holding, plate, parallel uprights with said plate unmovably mounted directly thereon, a stripper plate slidably mounted upon said uprights below said body form plate, adaptable to hold the finished shells within the moulds in said body form plate when the inside formers hereinafter referred to are withdrawn, an inside former plate, with inside formers thereon, slidably mounted on said uprights beneath said stripper plate, means for clamping said stripper plate and inside former plate to said mould holding plate, a heater plate slidably mounted on said uprights below said inside former plate, a table plate slidably mounted on said uprights beneath said heater plate, lifting and lowering means for said table plate, a punch plate with punches mounted thereon slidably mounted on said uprights above said body form plate, lifting and lowering means for said punch plate, and means adaptable to catch said shells as they are forced out of the moulds in said body form plate.

2. In a device of the kind described the combination of a body form, mould holding, plate, parallel uprights with said plate unmovably mounted directly thereon, a stripper plate slidably mounted upon said uprights below said body form plate, adaptable to hold the finished shells within the moulds in said body form plate when the inside formers hereinafter referred to are withdrawn, an inside former plate, with inside formers thereon slidably mounted on said uprights beneath said stripper plate, means for clamping said stripper plate and inside former plate to said mould holding plate, a heater plate slidably mounted on said uprights below said inside former plate, a table slidably mounted on said uprights beneath said heater plate, lifting and lowering means for said table plate, a punch plate with punches mounted thereon slidably mounted on said uprights above said body form plate, and lifting and lowering means for said punch plate.

3. In a device of the kind described the combination of a body form, mould holding plate, parallel uprights with said plate unmovably mounted directly thereon, a stripper plate slidably mounted upon said uprights below said body form plate, adaptable to hold the finished shells within the moulds in said body form plate when the inside formers hereinafter referred to are withdrawn, an inside former plate, with inside formers thereon, slidably mounted on said uprights beneath said stripper plate, a heater plate slidably mounted on said uprights below said inside former plate, a table plate slidably mounted on said uprights beneath said heater plate, lifting and lowering means for said table plate, a punch plate with punches mounted thereon slidably mounted on said uprights above said body form plate, lifting and lowering means for said punch plate, and means adaptable to catch said shells as they are forced out of the moulds in said body form plate, said last mentioned means having other means for attachment and removal of said first means to said device.

4. In a device of the kind described the combination of a body form, mould holding, plate, parallel uprights with said plate unmovably mounted directly thereon, a stripper plate slidably mounted upon said uprights below said body form plate, adaptable to hold the finished shells within the moulds in said body form plate when the inside formers hereinafter referred to are withdrawn, an inside former plate, with inside formers thereon, slidably mounted on said uprights beneath said stripper plate, a heater plate slidably mounted on said uprights below said inside former plate, a table plate slidably mounted on said uprights beneath said heater plate, lifting and lowering means for said table plate, a gate valve plate mounted on said uprights above the body form plate, a punch plate with punches mounted thereon slidably mounted on said uprights above said body form plate, lifting and lowering means for said punch plate, and means adaptable to catch said shells as they are forced out of the moulds in said body form plate.

5. In a device of the kind described the combination of a body form, mould holding, plate, parallel uprights with said plate unmovably mounted directly thereon, a stripper plate slidably mounted upon said uprights below said body form plate, adaptable to hold the finished shells within the moulds in said body form plate when the inside formers hereinafter referred to are withdrawn, an inside former plate, with inside formers thereon, slidably mounted on said uprights beneath said stripper plate, a heater plate slidably mounted on said uprights below said inside former plate, a table plate slidably mounted on said uprights beneath said heater plate, lifting and lowering means for said table plate, a gate valve plate mounted on said uprights above the body form plate, a punch plate with punches mounted thereon slidably mounted on said uprights above said body form plate, and lifting and lowering means for said punch plate.

In testimony whereof I affix my signature.
WILLIAM G. LLOYD.